Figure 3:
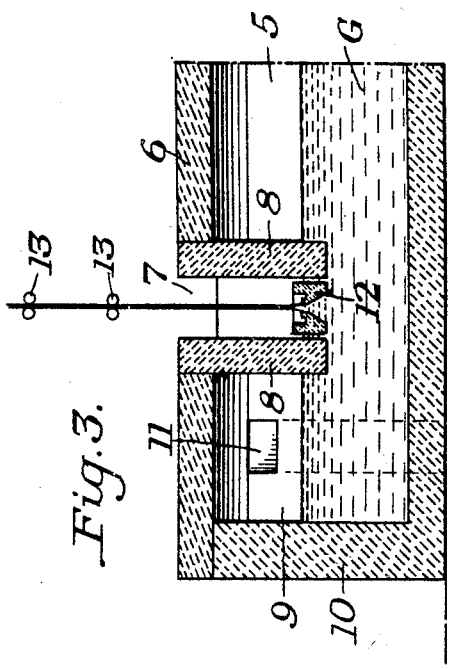

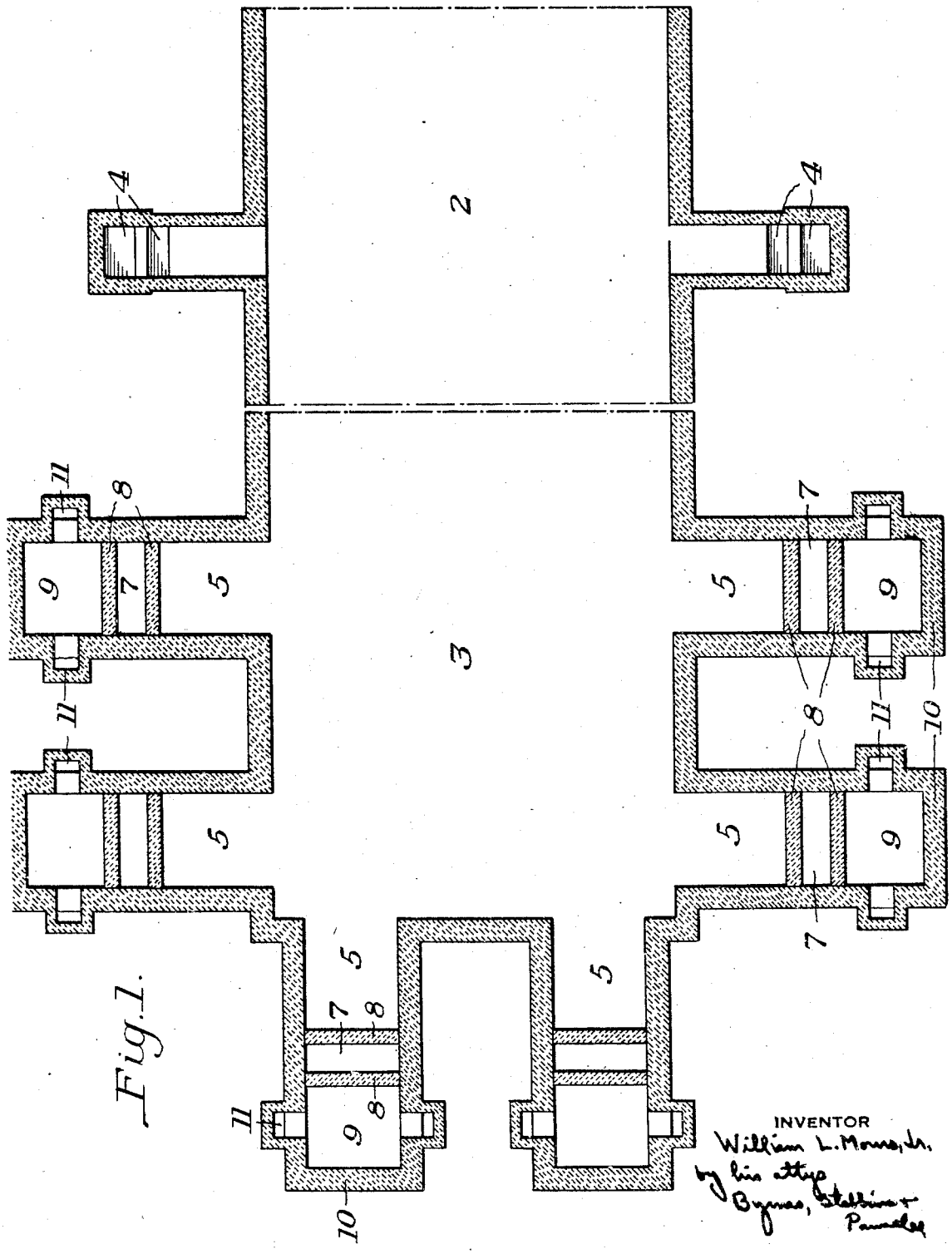

Nov. 24, 1931.  W. L. MONRO, JR  1,833,119
MAKING SHEET GLASS
Filed Feb. 24, 1927   2 Sheets-Sheet 2

INVENTOR
William L. Monro, Jr
by his attys
Byrnes, Stebbins & Parmelee

Patented Nov. 24, 1931

1,833,119

UNITED STATES PATENT OFFICE

WILLIAM L. MONRO, JR., OF PITTSBURGH, PENNSYLVANIA, ASSIGNOR TO WINDOW GLASS MACHINE COMPANY, OF PITTSBURGH, PENNSYLVANIA, A CORPORATION OF NEW JERSEY

MAKING SHEET GLASS

Application filed February 24, 1927. Serial No. 170,501.

This invention relates to the making of sheet glass, and particularly to the making of glass by the well known Fourcault process.

At the present time there are two well known processes of making glass in sheet form. One of these is the Fourcault process, and the other is the Libbey-Owens or Colburn process.

In the Colburn process the surface of a bath of glass is engaged by a suitable bait, and a sheet is drawn upwardly therefrom. The width of the sheet is maintained by rolls engaging the sheet edges. The line of generation of the bath is maintained in its position in part by the edge rolls, in part by coolers employed above the bath so as to cause a valley of temperature on the surface of the bath, but principally by a bending roll over which the drawn sheet travels. This process is open to numerous objections, one of which is that ordinarily only one machine is applied to a tank. This means that the fuel cost is very high.

In the Fourcault process the glass, instead of being drawn from the surface of a bath, is drawn from the top of a slot formed in a clay block known as a debiteuse. The debiteuse is of material depth and it is provided with a dam around its top. The debiteuse is depressed in a molten bath until the glass wells up through the top of the slot. It is "picked off" by a bait to start a draw, and thereafter the sheet is drawn in a vertical direction only. It is not passed over a bending roll, as no bending roll is needed to maintain the position of a line of generation, as in the Colburn process.

The Fourcault machine is superior to the Colburn machine in that several units may be applied to a single melting tank, thus economizing heat. However, as the machines have been heretofore arranged, the conditions at one machine have materially affected the conditions at other machines. The usual Fourcault installation comprises a melting tank having means for supplying batch material at one end and having a neck at the other end by which molten glass may be withdrawn. The neck is connected to a long drawing chamber arranged at substantially right angles to the tank. Each side of the drawing chamber constitutes a separate dead-ended bay and three or more machines are arranged in each bay with the tank of each machine extending across the drawing chamber. Refractory shields are placed on each side of each tank, these shields extending from the cap of the drawing chamber and terminating several inches below the surface of the glass. The spaces between the shields of adjacent machines constitute chambers which are generally heated.

As above stated, the debiteuse is of considerable depth and is generally immersed in the glass to a depth of approximately eight inches. The shields usually extend into the glass about the same distance. If we consider an imaginary horizontal plane containing the bottom of each debiteuse and the bottom of each shield, it will be seen that the glass lying above such plane is dead or pocketed glass. The major portion of the flow probably takes place beneath this heated portion, although temperature conditions will vary this to some extent. It is a fact however, that the glass lies idle in the chambers and the quality of the glass is lowered on this account. It is well known that in ordinary Fourcault operation, the machines lying closest to the source of supply produce the best glass, and that the quality is progressively lowered as the end machines are approached.

Another difficulty which is encountered in ordinary operation arises from the fact that very frequently the rising sheet breaks, and in order to make ready to start another draw in the same unit, it is necessary to reheat the chamber containing the debiteuse of that particular machine. The heat is conducted through the glass, and the operation of all the machines lying between the machine in question and the end of the bay is affected. This is due to the fact that the glass must flow past the reheated machine in order to supply the machines lying closer to the end of the bay.

I provide an improved method and apparatus for supplying glass to the several units in a Fourcault installation whereby the quality of glass produced in all the units will be high. Instead of passing glass to certain of the units in such manner that it must pass under the debiteuse of another unit, I supply glass to each unit by a separate path. This is preferably done by providing a chamber connected to a melting tank, and providing separate bays in the chamber wall, each having a single unit associated therewith. Means is preferably provided in each bay for specially heating the glass in that space lying behind the debiteuse and remote from the chamber. The pool of glass in the chamber is of such volume and is at such temperature that reheating of one unit will leave the other units substantially unaffected. None of the other units draws the glass which lies within the reheating zone and there is substantially no pocketing of glass, as occurs in the ordinary installations.

Figure 2:
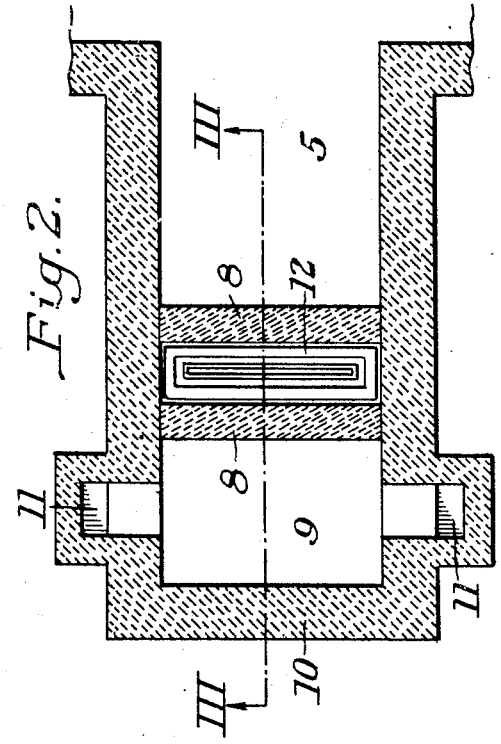
Figure 4:
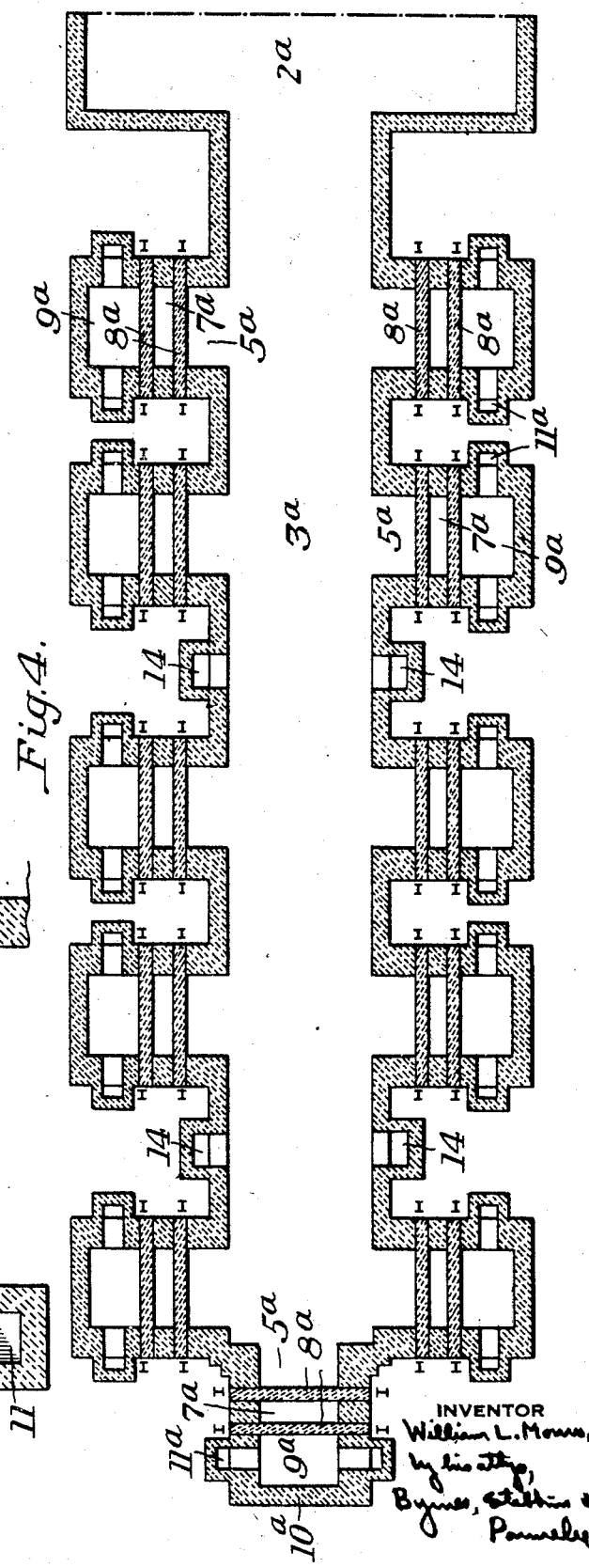

In the accompanying drawings which illustrate more or less diagrammatically the present preferred embodiment of my invention and one modification thereof, Figure 1 is a horizontal section through a part of a melting tank having my invention applied thereto, Figure 2 is a view to enlarged scale showing one of the bays of Figure 1, Figure 3 is a vertical section through one of the bays taken on the line III—III of Figure 2, and Figure 4 is a view corresponding to Figure 1, but showing a modified structure.

Referring first to Figures 1 to 3, there is shown a portion of a melting tank 2 connected to a chamber 3. The chamber 3 forms an extension of the tank 2. The tank 2 is provided with the usual means (not shown) for supplying batch material, and is heated by gas and air supplied through ports 4, the furnace being of the usual reversing type.

The chamber 3 is provided with a plurality of bays 5, each having associated therewith a separate Fourcault drawing unit. Each bay has a cap 6 having an opening 7 formed therein. The opening 7 extends across the bay 5 and at each side is provided with a shield 8. Each shield terminates some distance below the surface of the glass G which lies in the bay. The chamber 9 which lies between the drawing unit and the end wall 10 of the bay is arranged to be heated, and for this purpose is provided with combustion ports 11. These ports are connected to checkers and are operated in the same manner as an ordinary reversing furnace.

The space between the shields 8 comprises the chamber containing the debiteuse 12. I have shown lifting rolls 13, but have not illustrated the means for depressing the debiteuse in the glass, nor have I illustrated in any detail the lifting mechanism, as this forms no part of the present invention.

In operation the glass flows from the tank 2 to the chamber 3 in substantially a straight line until it reaches a bay 5, and is there taken off to supply the machine in that particular bay. The glass is not unduly disturbed in its flow and this results in a higher quality of product. The main stream is divided into smaller streams, each supplying an individual unit.

In the event that a rising sheet of glass in any of the units breaks, it is necessary to reheat the chamber between the shields 8 before another draw can be started. This is usually done by portable burners which are taken to the machine in question. With my construction, reheating at any machine has substantially no effect on any of the other units. This is due to the fact that the pool of glass lying in the chamber 3 is very large relative to the amount of glass contained in any bay, and also due to the fact that the stream-like flow through the chamber 3 to any machine is not affected by whatever takes place in a smaller stream which has been diverted from the main stream.

Figure 4 illustrates a modified form of the invention. In this drawing, parts corresponding to similar parts in Figures 1 and 2 have been given the same reference character with an "$a$" suffixed thereto. In this form of the invention the chamber $3a$ is made relatively long and narrow so that a large number of machines can be placed on each side. The same conditions will obtain in this installation as in the installation of Figures 1 to 3, although it may be desirable to specially heat the chamber. For this purpose I provide ports 14. The chamber 3 of Figure 1 is heated by radiation from the melting tank 2.

It will be noted that in both Figures 1 and 4 the machines are arranged in relatively closely spaced pairs. In each case, however, the arrangement is such that there is an open space on each side of each pair of machines of sufficient size to accommodate a debiteuse. This arrangement is desirable because it permits of readily changing a broken debiteuse.

I have illustrated and described a preferred form of my invention, but it will be understood that it is not limited to this form alone, as it may be otherwise embodied or practiced within the scope of the following claim.

I claim:—

Apparatus for making sheet glass, including a chamber having a plurality of bays formed in the chamber wall and adapted to receive glass from the chamber, and a single Fourcault sheet drawing unit associated with each bay, the bays being arranged in pairs with an open space on each side of a pair of bays at least as long as a debiteuse for a unit.

In testimony whereof I have hereunto set my hand.

WILLIAM L. MONRO, Jr.